(12) United States Patent
Husen et al.

(10) Patent No.: US 9,497,744 B2
(45) Date of Patent: Nov. 15, 2016

(54) SIGNALING OF TRANSMISSION SETTINGS IN MULTI-USER SYSTEMS

(75) Inventors: Sri Andari Husen, Eindhoven (NL); Semih Serbetli, Eindhoven (NL); Ying Wang, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 191 days.

(21) Appl. No.: 12/919,029

(22) PCT Filed: Mar. 2, 2009

(86) PCT No.: PCT/IB2009/050826
§ 371 (c)(1),
(2), (4) Date: Aug. 24, 2010

(87) PCT Pub. No.: WO2009/109894
PCT Pub. Date: Sep. 11, 2009

(65) Prior Publication Data
US 2011/0002319 A1    Jan. 6, 2011

(30) Foreign Application Priority Data
Mar. 4, 2008    (EP) .................... 08152226

(51) Int. Cl.
*H04W 4/00*    (2009.01)
*H04W 72/04*   (2009.01)
(Continued)

(52) U.S. Cl.
CPC ........... *H04W 72/042* (2013.01); *H04W 28/18* (2013.01); *H04W 48/08* (2013.01)

(58) Field of Classification Search
CPC .................................................. H04W 84/12
(Continued)

(56) References Cited

U.S. PATENT DOCUMENTS 8,320,301 B2 * 11/2012 Walton et al. ............... 370/328
2004/0082356 A1   4/2004 Walton et al.
(Continued)

FOREIGN PATENT DOCUMENTS

EP    1392004 A2    2/2004
EP    1737176 A1   12/2006
(Continued)

OTHER PUBLICATIONS

Aoki et al: "Preamble Structure for MIMO-OFDM WLAN Systems Based on IEEE 802.11"; The 17th Annual IEEE International Symposium on Personal, Indoor and Mobile Radio Communications (PIMRC'06). 6 Page Document.
(Continued)

*Primary Examiner* — Christopher R Crompton

(57) ABSTRACT

The present invention relates to a transmitting apparatus, a receiving apparatus, a system, a signal, and a method of multi-user transmission, wherein transmission settings are divided into common signal information, containing settings/information relevant for multiple receivers and user stream specific information, containing settings/information relevant only to a related user stream. Furthermore, the common signal information may comprise at least one of a duration of the longest user stream field and multi-user resource allocation field, so that the receivers know the mapping of user streams to receivers.

16 Claims, 4 Drawing Sheets

(51) Int. Cl.
*H04W 28/18* (2009.01)
*H04W 48/08* (2009.01)

(58) Field of Classification Search
USPC ........................................................ 370/338
See application file for complete search history.

(56) References Cited

U.S. PATENT DOCUMENTS

| | | | |
|---|---|---|---|
| 2005/0120097 A1 | 6/2005 | Walton et al. | |
| 2006/0176881 A1* | 8/2006 | Ma .................... | H04L 12/189 370/392 |
| 2006/0268878 A1* | 11/2006 | Jung et al. .................. | 370/392 |
| 2007/0070927 A1 | 3/2007 | Shoki et al. | |
| 2007/0211823 A1 | 9/2007 | Mazzarese et al. | |
| 2007/0217370 A1* | 9/2007 | Soong et al. ................ | 370/337 |
| 2007/0248046 A1 | 10/2007 | Khan | |
| 2007/0286149 A1* | 12/2007 | Yamamoto et al. .......... | 370/345 |
| 2007/0286238 A1* | 12/2007 | Wang et al. ................. | 370/478 |
| 2009/0268701 A1* | 10/2009 | Welborn et al. .............. | 370/336 |
| 2011/0150004 A1 | 6/2011 | Denteneer et al. | |

FOREIGN PATENT DOCUMENTS

| | | |
|---|---|---|
| JP | 2007513571 A | 5/2007 |
| WO | 2007023379 A2 | 3/2007 |
| WO | 2008103313 A1 | 8/2008 |

OTHER PUBLICATIONS

Oka et al: Preamble Generation Using Genetic Algorithm for MIMO Wireless LAN System; ICACT 2007, pp. 1737-1742.

Gross et al: "P802.11 Dyn:Protocol Extension for the Application of Dynamic OFDM (A) Schemes in 802.11 a/g Systems";Technical University Berlin Telecommunications Group, TKN Technical Report, TKN-07-002, May 2007, 30 Page Document.

* cited by examiner

SIGNALING OF TRANSMISSION SETTINGS IN MULTI-USER SYSTEMS

FIELD OF THE INVENTION

The present invention generally relates to a transmitting apparatus, a receiving apparatus, a system, a signal, and a method of performing multi-user transmission to a plurality of receivers in a transmission systems such as—but not restricted to—a wireless local area network (WLAN).

BACKGROUND OF THE INVENTION

In wireless communication, the actual channel through which a signal is transmitted differs in dependence on the physical location of the transmitter and receiver and objects present in the environment. For instance, when a receiver is in a shadow, the receive signal strength can be very low. Wireless communication systems are usually designed to include a capability of measuring and estimating the channel and adapting the transmission settings accordingly so that a reliable transmission can be achieved.

For a receiver to decode a received signal into bits correctly, the receiver needs to know the transmission settings, among others, the modulation format, coding scheme and rate, and the amount of data transmitted. These settings are set by the transmitter taking into account the actual transmission channels to each receiver, which may only be available to the transmitter at the end of a channel reservation mechanism. On the other hand, the settings chosen by the transmitter must be known by the receivers prior to data transmission. This means that these settings should be communicated in a transmission with known/fixed transmission settings preceding the actual data transmission.

A potential for further bit-rate increases is seen in a use of multiple-input multiple-output (MIMO) antenna systems. To this end, a new medium access control (MAC) protocol mechanism has been proposed, which supports multi-user (MU) MIMO transmissions in WLANs according to IEEE 802.11 based standards. The proposed new protocol extends the single-user (SU) MIMO protocol in such a way that different stations can be destination stations for packets inside a MIMO frame (which is a set of packets transmitted simultaneously on different spatial streams). In ubiquitous networking, a station might thus be communicating with multiple other users at a time.

In wireless systems, such as for example 802.11a/g/n systems, data transmission settings can be transmitted in a dedicated field, e.g. the SIGNAL field in the 802.11a/g/n system, of the preamble of the transmission, after the transmission of training sequence for acquisition, synchronization, and channel estimation. However, the known systems are single-user systems.

SUMMARY OF THE INVENTION

It is an object of the present invention to provide a multi-user transmission scheme which facilitates conveyance of transmission settings in multi-user systems.

This object is achieved by a transmitting apparatus as claimed in claim 1, a receiving apparatus as claimed in claim 6, a method as claimed in claim 11, a system as claimed in claim 12, a computer program product as claimed in claim 14 and a multi-user transmission signal as claimed in claim 15.

Accordingly, the proposed solution enables communication of multi-user settings in a multi-user transmission signal to all receivers. The multi-user system performance can be improved, since each user stream can have different transmission setting. Moreover, transmission performance can be improved by jointly conveying common transmission settings.

In a specific example, the common information may comprise at least one of a duration information which indicates a duration of the longest user steam field, and a resource allocation information which indicates a mapping of user streams to the users or receivers. Thus, all users can be informed about how long the transmission will take and/or how the multiple user fields are mapped to different users.

As an option, the user stream specific information may be transmitted in a multi-user fashion. Thereby, the duration of the user stream specific information can be reduced significantly.

Multiple user streams of the same user or receiver may be mapped by demultiplexing the transmission frame into said multiple spatial user streams. Thus, a user stream to be transmitted to a user or receiver can be mapped by demultiplexing the stream into multiple spatial streams. This provides the advantage of more flexible transmission scheduling and shorter delay due to the fact that a transmission frame is carried by multiple streams. The user stream may be a spatial user stream.

The receiver apparatus may be adapted to check an assignment field of the preamble portion, to independently decode user specific stream indicated by the assignment information as being assigned to different users or receivers, and to discard those user specific streams not intended for the receiver apparatus. Hence, proper conveyance to and interpretation by the intended receivers can be ensured.

Further advantageous developments are defined in the dependent claims.

BRIEF DESCRIPTION OF THE DRAWINGS

The present invention will now be described based on various embodiments with reference to the accompanying drawings in which.

DETAILED DESCRIPTION OF EMBODIMENTS

Figure 1:
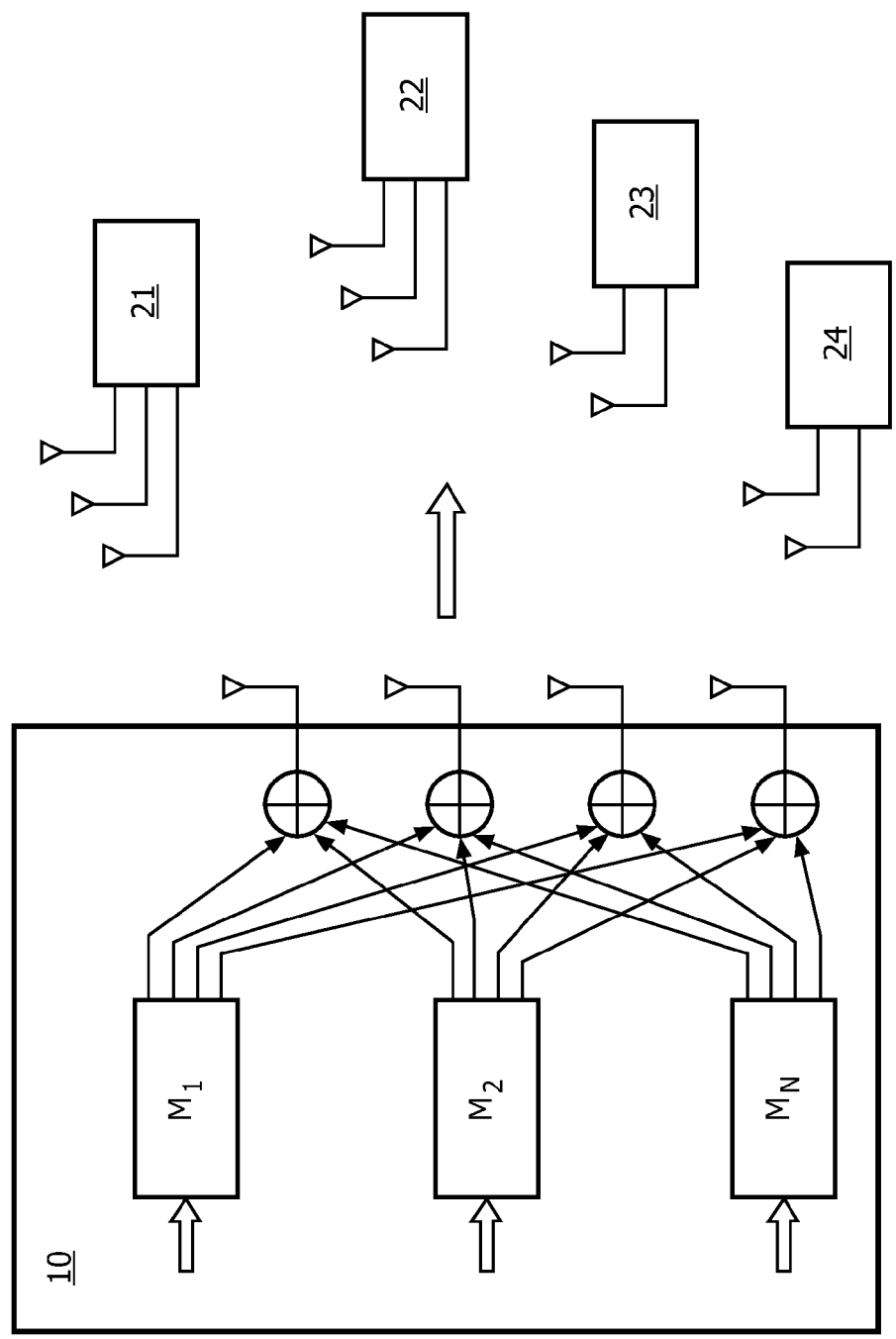
FIG. 1 shows a schematic block diagram of multi-user MIMO transmission system according to various embodiments of the present invention.

In the following, various embodiments are described on the basis of a MU MIMO system as shown in FIG. 1.

According to FIG. 1. a MU MIMO access point (AP) 10 provides WLAN access for an exemplary number of four stations 21 to 24 each having multiple antennas. The AP 10 comprises N different processing stages $M_1$ to $M_N$ for providing different coding and/or modulating schemes, to which input signals can be applied and which can be selectively connected to at least one of a plurality antennas.

In general, two types of MIMO techniques can be used in both directions between the AP 10 and each of the stations 21 to 24 based on the propagation channel properties, i.e. the structure of the spatial correlation matrix at the receiver's antenna array. In case of high correlation of the received signal different beamforming algorithms can be applied, while in case of low correlation of the received signal-diversity (DIV) and multiplexing (MUX) approaches may give better performance. In MUX schemes, multiple streams are transmitted simultaneously, each using one dedicated antenna. This increases the throughput with a factor equal to the number of streams being transmitted. In DIV schemes, multiple antennas are used in a different way. For the basic DIV scheme the transmitter uses only one antenna. The receiver with multiple antennas receives multiple copies of the transmitted signal so that using an appropriate signal processing algorithm achieves significantly higher signal-to-noise ratios (SNRs). In the schemes combining MUX and DIV, more transmit antennas are active, but the receiver, as in all DIV schemes, may still have more antennas than the number of streams. Multiplexing is present, but the receiver gets more information about the transmitted signal than in the pure MUX case.

The following embodiments provide enhancements for multi-user support e.g. for IEEE 802.11. The proposed solution is based on the observation that different transmission settings may be needed for multi-user MIMO transmission to be conveyed to the receivers for proper decoding. In MU-MIMO transmission, the channel experienced by each user is likely to be different. The multi-user system performance could be improved if each transmission can have different transmission settings, such as for example modulation format, coding scheme and rate, etc. adapted to the channel it experiences. Furthermore, when multiple-streams are allocated to one user, depending on the channel condition, the space time block coding can be used to code across multiple streams to improve the reliability of the transmission. Another user setting falling into this category could be the amount of the user data transmitted in the stream. Because the user stream for one receiver may be of no interest to another receiver, it may not be necessary for one receiver to decode the transmission intended for other receivers, and hence, the receiver does not need to have the knowledge of the settings of other user streams. This means that the user stream specific settings can be transmitted in a multi-user fashion. Additionally, common settings may either hold for all transmissions, regardless of the receivers, or they should be known by all receivers to ensure proper multi-user reception.

It is thus proposed to divide the transmission settings into COMSIG (common signal fields, containing settings/information relevant for all receivers) and USERSIGs (user stream specific signal fields, containing the settings/information relevant only to the related spatial stream), where the transmission of USERSIG can be either in single user (MIMO) fashion or multi-user (MIMO) fashion. The latter reduces the duration of the USERSIG approximately $1/N_{user}$ times ($N_{user}$ being the number of intended users) than the prior where the USERSIGs be transmitted in the time division manner.

In case of MU-MIMO, these common settings may include for example bandwidth of the transmission (when different bandwidth of transmissions are supported), and for example at least one of two new signal information fields, i.e., an information field about the duration of the longest stream and a multi-user resource allocation (MU-RA) field, that do not exist in IEEE 802.11a/b/g/n standards.

More specifically, the duration of the longest spatial stream field could be conveyed, so that, in the beamformed MU-MIMO transmission, all receivers know the amount of time the receivers must keep silent and all receivers can use this information as reference for multiuser acknowledgement phase. The multi-user resource allocation field could be conveyed, so that the receivers know the mapping of spatial streams to receivers. The duration field of the longest stream may needed to be communicated to all users to be served in the beamformed MU-MIMO transmission to inform them how long the transmission will take. This duration may be different than the individual duration of the users, and it tells the users to keep silent for this duration even if their signal is fully received. Furthermore, the end of the MU-MIMO transmission can serve as a reference time for the multiuser acknowledgement (ACK) phase (instead of extending all spatial streams to the same duration by zero-padding so that the reference time for the multiuser ACK phase is observable by all receivers). To keep the length of the duration of the longest stream (in terms of time, not the number of bits) to a minimum number of bits, this information can be represented in terms of number of orthogonal frequency division multiplexing (OFDM) symbols that the MU-MIMO transmission will take. Another approach can be using zero-padding to make the duration of each stream equal to each other.

The second new signal information field MU-RA indicates how the multiple spatial streams in MU-MIMO transmission are mapped to different users. In current WLAN standards, there is no such kind of signal field due to their nature of single user transmission in a single transmission opportunity. However, the downlink of the MU MIMO transmission may consider a point-to-multipoint communication, so that certain spatial streams of the transmitted signal are intended for certain users/receivers. Besides, multiple spatial streams can also be allocated to one user/receiver. If this is the case, there are two possibilities of mapping the user stream: (1) mapping one complete media access control (MAC) frame to one spatial stream, or (2) demultiplexing a MAC frame into the multiple spatial streams. The latter has the advantage of more flexible transmission scheduling and potentially shorter delay because a MAC frame is carried by multiple streams. However, in order for the user/receiver to decode the MU MIMO signal appropriately and combine/multiplex the multiple spatial streams properly to form the MAC frames, the mapping of the spatial streams to the users/receivers (as well as the demultiplexing mechanism) should be communicated to the users/receivers. Additionally, if the MU-MIMO transmission is preceded with an exchange of MU-RTS (Request to Send) and CTS (Clear to Send) packets according to the 802.11 RTS/CTS mechanism for reducing frame collisions, each user will know exactly which spatial streams are intended for itself in the physical (PHY) protocol layer, and can try to decode only those spatial streams rather than trying to decode all spatial streams in the PHY layer and checking the MAC addresses of each MAC frame.

In the following example, an illustration is given how the above information can be conveyed and interpreted by the intended receivers. It is assumed that the AP 10 of FIG. 1 is allowed to transmit up to four spatial streams. For each spatial stream, there are thus five assignment options, i.e., allocating it to any one out of the four receivers 21 to 24 or not allocating it to any receiver. Because there are four spatial streams to be assigned, there are 5×5×5×5=625 assignment possibilities. These possibilities can be represented with a 10 bit (=1024 possibilities) M-SIG assignment field. Upon receiving this information, a respective one of the receivers 21 to 24 checks the assignment field and interprets the assignment information. When each spatial stream is assigned to a different receiver/user stream, the receiver decodes each stream independently and passes all decoded streams to the MAC layer which will discard the stream not intended for it. When a user stream for a receiver is demultiplexed into multiple spatial streams, interpreted from the assignment fields, the receiver then can multiplex and decode the user streams properly.

If the transmission is preceded with MU-RTS and CTS exchanges, the designation of the receivers 21 to 24 can be obtained from the order of appearance of the receivers MAC addresses in the MAC frame.

Figure 2:
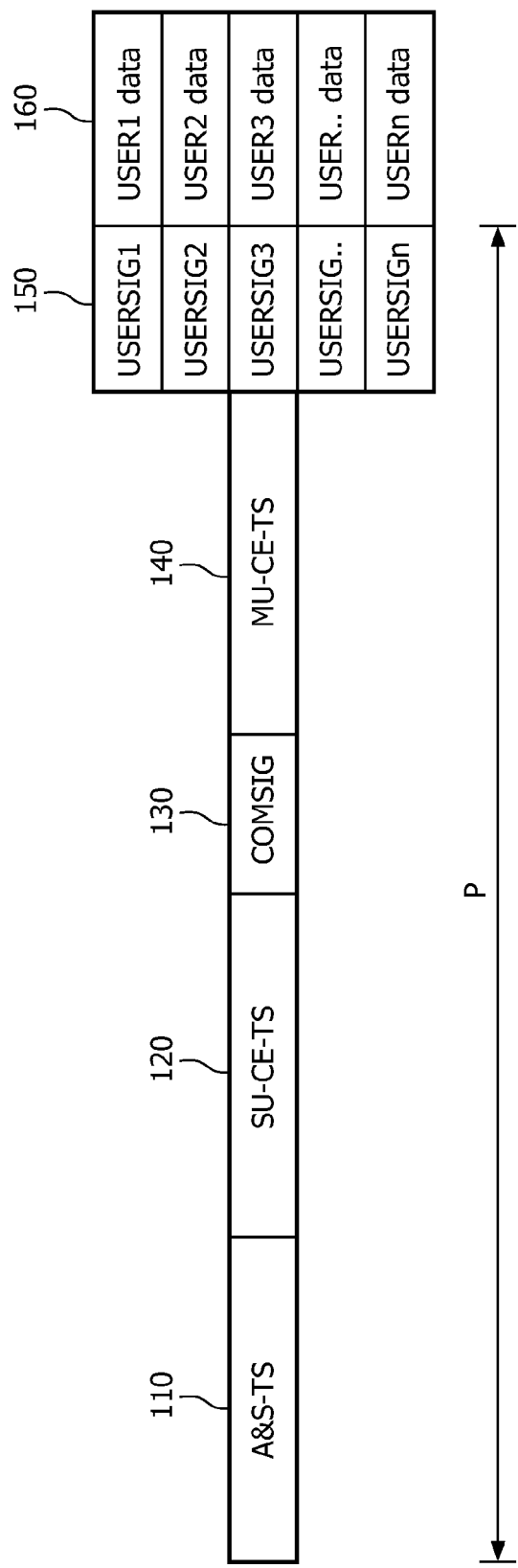
FIG. 2 shows a preamble structure according to a first embodiment.

FIG. 2 shows a schematic structure of a preamble P according to a first embodiment. The transmitter side of the AP 10, the preamble is divided into two parts: a single user part and a multi user part.

The single user part may comprise several fields, namely:
A training field 110 for an acquisition and synchronization training sequence (A&S-TS), where a STF (Short Training Field) e.g. as in 802.11/a/g can be used,
A SU training field 120 for a single user SISO/SIMO channel estimation training sequence (SU-CE-TS), where a (HT) LTF (Long Training Field) e.g. as in 802.11(n) can be used, and
A common signal (COMSIG) field 130 containing common settings. The transmission settings for this field are known to the receiver and are usually the most robust transmissions.

The above fields can be transmitted sequentially over the channel.

The multi user part may comprise two fields, namely:
A MU training field 140 for a multi-user MIMO channel estimation training sequence (MU-CE-TS). The training field 140 can be similar to 802.11n HT-LTFs. The number of HT-LTF transmitted in this field may be equal to the number of space time stream minus one (it is noted that the first HT-LTF is transmitted in the single user part of the preamble). When beamforming is used, the MU training field 140 may also be beamformed transmitted.
User stream specific signal fields (USERSIG) 150 which contain user-stream specific settings and may be different for each user (receiver). Unlike the other fields, these USERSIG fields 150 may be transmitted simultaneously in a multi-user MIMO fashion. The transmission of these USERSIG fields 150 in multi-user MIMO fashion can happen only after the MU training field 140 for multi-user MIMO channel estimation so that the receivers, having estimated the channel, are able to decode their USERSIGs properly.

The number of USERSIG fields 150 is dependent on the number of spatial streams 160 (USER1 to USERn data) in the MU-MIMO transmissions. The designation of the USERSIG fields 150, which is the same as the designation of the spatial streams, is reflected in the MU-RA field. When a user has more than one spatial stream designated to it, he will receive more than one of the USERSIG fields 150. It is, therefore, possible for the streams of the same receiver to have different transmission settings (e.g. modulation format).

Figure 3:
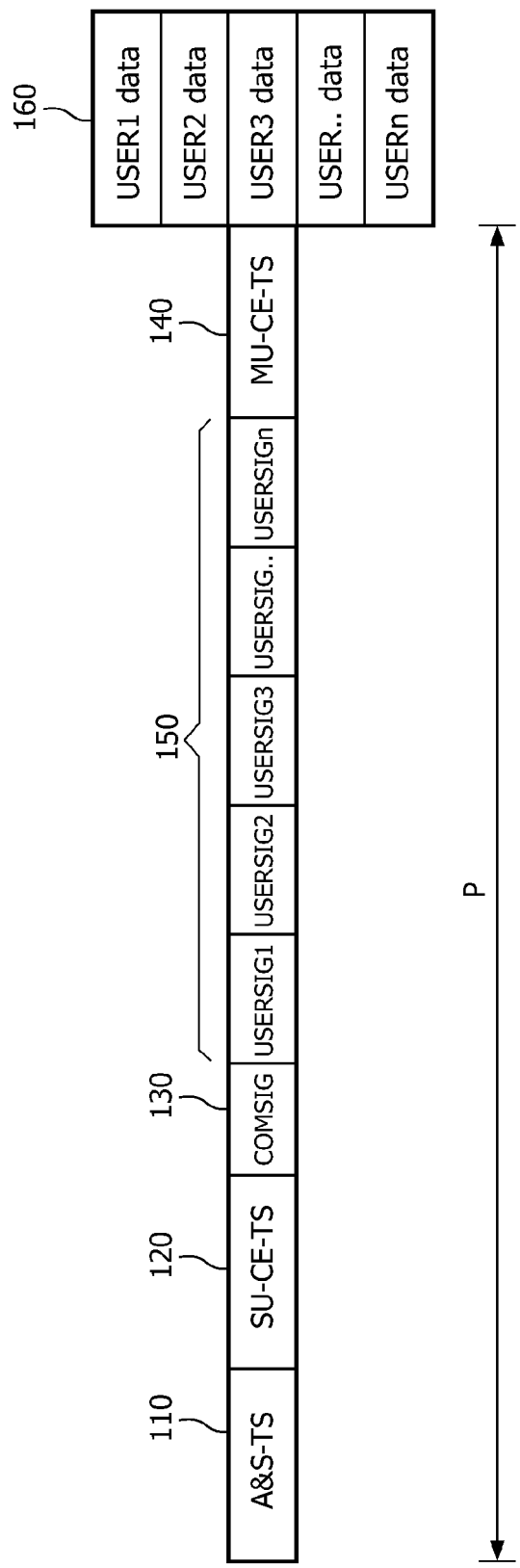
FIG. 3 shows a preamble structure according to a second embodiment.

FIG. 3 shows an alternative structure of a preamble P according to a second embodiment. Here all USERSIG fields 150 are transmitted sequentially in time division fashion. It is not required that the MU-MIMO channel estimation training field 140 precedes the USERSIG fields 150 and hence the USERSIG fields 150 can be transmitted either before or after the transmission of MU-MIMO channel estimation training field 140 in the single user or beamformed mode respectively. For the preamble P in FIG. 3, the receivers 21-24 of the intended transmission system may decode all the USERSIG fields 150 and discard all USERSIG fields 150 except for the USERSIG field 150 designated for the respective receiver, and the related information all receivers must extract.

Since all USERSIG fields 150 are available to all receivers, a receiver can find the longest duration information by comparing that information from all USERSIG fields 150. Therefore it is no longer necessary in the second embodiment to include this information in the COMSIG field 130.

The preamble structure of the first embodiment is more advantageous with respect to the preamble structure of the second embodiment structure in terms of preamble overhead because its duration of the USERSIG field 150 is about $1/N_{user}$ times shorter ($N_{user}$ being the number of intended users). However, the preamble structure of the second embodiment also brings some advantages for the MAC and PHY layers. Firstly, since all users can access to the modulation and coding scheme (MCS) of each spatial stream/user, this information can be used on the PHY layer to implement advanced MIMO receivers at the receivers based on successive interference cancellation. Secondly, this type of preamble gives the opportunity to deploy MU MIMO transmission without the need of exchanging M-RTS and CTS prior to the actual transmission. Since the USERSIG fields are not transmitted in the beamformed (MU MIMO) form, every user can access the USERSIG fields 150 of all users, and thus, every user can try to decode each spatial stream on the PHY layer utilizing the information in the USERSIG fields 150. In this way, the MAC addresses of the MAC frames formed by each decodable spatial stream can be checked on the PHY layer, and understand if that particular spatial stream is intended for itself or not. Thus, when this type of preamble is used in MU-MIMO transmission, M-RTS and CTS exchange mechanism is not mandatory to inform the users that they will be receiving signals. Thus, the overhead of M-RTS and CTS exchange mechanism can be reduced.

Figure 4:
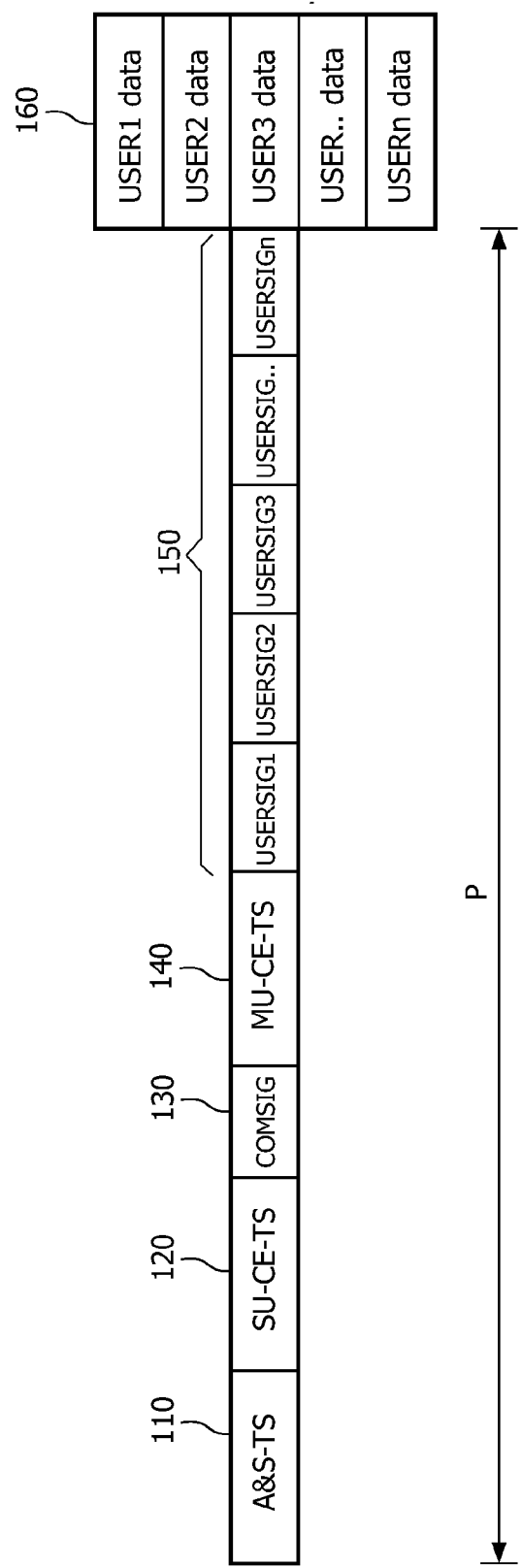
FIG. 4 shows a preamble structure according to a third embodiment.

FIG. 4 shows a schematic structure of a preamble P according to a third embodiment where the USERSIG fields 150 are transmitted consecutively in MU MIMO (beamformed) mode. The beamformed transmission may prevent these fields to be appropriately decoded by all users/receivers as in the preamble structure of the second embodiment shown in FIG. 3. Thus, the advantages of the preamble P of FIG. 3 are not valid for the preamble P of FIG. 4. However, this preamble P is advantageous in that the valuable USERSIG fields 150 are transmitted in beamformed mode. Thus, they have the beamforming gain, and due to consecutive transmission, they are not affected by any MU MIMO interference, and can be decoded more reliably.

When comparing the first and second preamble structures of FIGS. 2 and 3 to existing 802.11a/g preamble structure, it can be noticed that the same training fields as in the existing 802.11a/g training fields can be used for the SISO training fields of the proposed preamble structures. In this respect the first two training fields 110, 120 are backward compatible. By combining the usage of the rate and length fields, the SIGNAL field of the existing 802.11a/g preamble structure can be used to convey the duration of the longest transmission. For legacy devices (e.g. in 5 GHz, the 802.11a/n devices), the duration of the longest transmission information can be used to set their network allocation vectors (NAV's) properly, even though the rest of the transmission may not be decoded properly by those devices. Other information conveyed in the proposed COMSIG field 150 can be appended following the L-SIG assignment filed. It is noted that compliance with 802.11a is sufficient for compliance with 802.11n.

In summary, a multi-user transmission scheme has been described, wherein transmission settings are divided into common signal information, which contains common information relevant for multiple ones of the receivers, and user stream specific information, which contains user stream specific information relevant only to a related user stream, and wherein the common signal information and the user stream specific information is conveyed in separate dedicated fields of a preamble portion of the multi-user transmission.

It is noted that the present invention is not restricted to the above embodiments and can be used for any multi-user transmission scheme with spatial and non-spatial user streams, not only MU MIMO. More specifically, the invention is applicable to all types of MIMO based WLANs. The protocol works in both single-user (SU) and MU mode. Moreover, the invention is applicable to all multi-user wireless systems with a random access mechanism. The above mentioned term "preamble" is intended to cover any information portion (preamble, header or the like) added to a payload portion which covers the actual data to be transmitted.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. A single processor or other unit may fulfill the functions of several items recited in the claims. The mere fact that certain measures are recited in mutually different dependent claims does not indicate that a combination of these measures cannot be used to advantage. A computer program used for controlling processor to perform the claimed features may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. A transmitting apparatus for performing multi-user transmission to a plurality of receivers, said apparatus being adapted:
   a) to divide transmission settings of said multi-user transmission into a common signal information field containing common transmission settings adapted to channel conditions relevant for multiple ones of said receivers, and at least one user stream specific information field containing user stream specific information relevant only to a related user stream, wherein a designation of said receivers is determined from an order of appearance of MAC addresses of said receivers; and
   b) to convey said common signal information and said user stream specific information in separate dedicated fields of a preamble portion of said multi-user transmission.

2. The apparatus according to claim 1, wherein said apparatus is adapted to provide in said common information at least one of a duration information which indicates a duration of a longest user steam field, and a resource allocation information which indicates a mapping of user streams to said receivers.

3. The apparatus according to claim 1, wherein said apparatus is adapted to transmit said user stream specific information in a multi-user fashion.

4. The apparatus according to claim 1, wherein said apparatus is adapted to map a user stream to be transmitted to a select one of said plurality of receiver by demultiplexing the stream into multiple transmission streams.

5. The apparatus according to claim 1, wherein said user stream is a spatial user stream.

6. A receiving apparatus for receiving a multi-user transmission signal, said apparatus being adapted:
   a) to detect, in separate dedicated fields of a preamble portion of said multi-user transmission, a common signal information and a user stream specific information, wherein a designation of receivers is determined from an order of appearance of MAC addresses of said receivers; and
   b) to derive from said common signal information common transmission settings adapted to channel conditions relevant for multiple receivers, and from said user stream specific information a dedicated user stream specific information relevant only to a corresponding one of said receiving apparatus.

7. The apparatus according to claim 6, wherein said apparatus is adapted to derive from said common information at least one of a duration information which indicates a duration of a longest user steam field, and a resource allocation information which indicates a mapping of user streams to said plurality of-receivers.

8. The apparatus according to claim 6, wherein said user stream is a spatial user stream.

9. The apparatus according to claim 6, wherein said apparatus is adapted to receive said user stream specific information in a multi-user fashion.

10. The apparatus according to claim 6, wherein said apparatus is adapted to check an assignment field of said preamble portion, to independently decode user specific stream indicated by said assignment information as being assigned to different receivers, and to discard those user specific streams not intended for said apparatus.

11. A method, operable in a processing system, for performing multi-user transmission between a transmitter and a plurality of receivers, said method when executed on the processing system causes the processing system to:
   a) divide transmission settings of said multi-user transmission into common signal information, containing common transmission settings adapted to channel conditions relevant for multiple ones of said plurality of receivers, and user stream specific information containing user stream specific information relevant only to a related user stream, wherein a designation of said receivers is determined from an order of appearance of MAC addresses of said receivers; and
   b) convey said common signal information and said user stream specific information in separate dedicated fields of a preamble portion of said multi-user transmission.

12. A system for multi-user transmission comprising at least one transmitting apparatus for performing multi-user transmission to a plurality of receivers, said at least one transmitting apparatus being adapted to:
   a) divide transmission settings of said multi-user transmission into common signal information containing common transmission settings adapted to channel conditions for multiple ones of said receivers, and user stream specific information containing user stream specific information relevant only to a related user stream, wherein a designation of said receivers is determined from an order of appearance of MAC addresses of said receivers; and b) convey said comment signal information and said user stream specific information in separate dedicated fields of a preamble portion of said multi-user transmission to at least one receiving apparatus.

13. The system according to claim 12, wherein said at least one transmitting apparatus and said at least one receiving apparatus are at least part of a wireless network with a random access mechanism.

14. A computer-readable storage-medium that is not a transitory propagating signal or wave, comprising a program product wherein when the program product is run on a transmitting apparatus causes the transmitting apparatus to:

a) divide transmission settings of a multi-user transmission into common signal information containing common transmission settings adapted to channel conditions for multiple ones of a plurality of receivers, and user stream specific information, which contains user stream specific information relevant only to a related user stream, wherein a designation of said receivers is determined from an order of appearance of MAC addresses of said receivers; and b) convey said common signal information and said user stream specific information in separate dedicated fields of a preamble portion of said multi-user transmission.

15. A method for operating a receiver, the method comprising:

a) detecting, in separate dedicated fields of a preamble portion of a multi-user transmission, a common signal information and a user stream specific information, wherein a designation of receivers is determined from an order of appearance of MAC addresses of said receivers; and b) deriving from said common signal information, common transmission settings adapted to channel conditions relevant for multiple receivers, and from said user stream specific information a dedicated user stream specific information relevant only to a corresponding one of said receiving apparatus.

16. A computer-readable storage-medium that is not a transitory propagating signal or wave, comprising a program product wherein when the program product is run on a receiving apparatus causes the receiving apparatus to:

a) detect, in separate dedicated fields of a preamble portion of said multi-user transmission, a common signal information and a user stream specific information, wherein a designation of receivers is determined from an order of appearance of MAC addresses of said receivers; and b) derive from said common signal information common transmission settings adapted to channel conditions relevant for multiple receivers, and from said user stream specific information a dedicated user stream specific information relevant only to a corresponding one of said receiving apparatus.

* * * * *